Patented Nov. 7, 1950

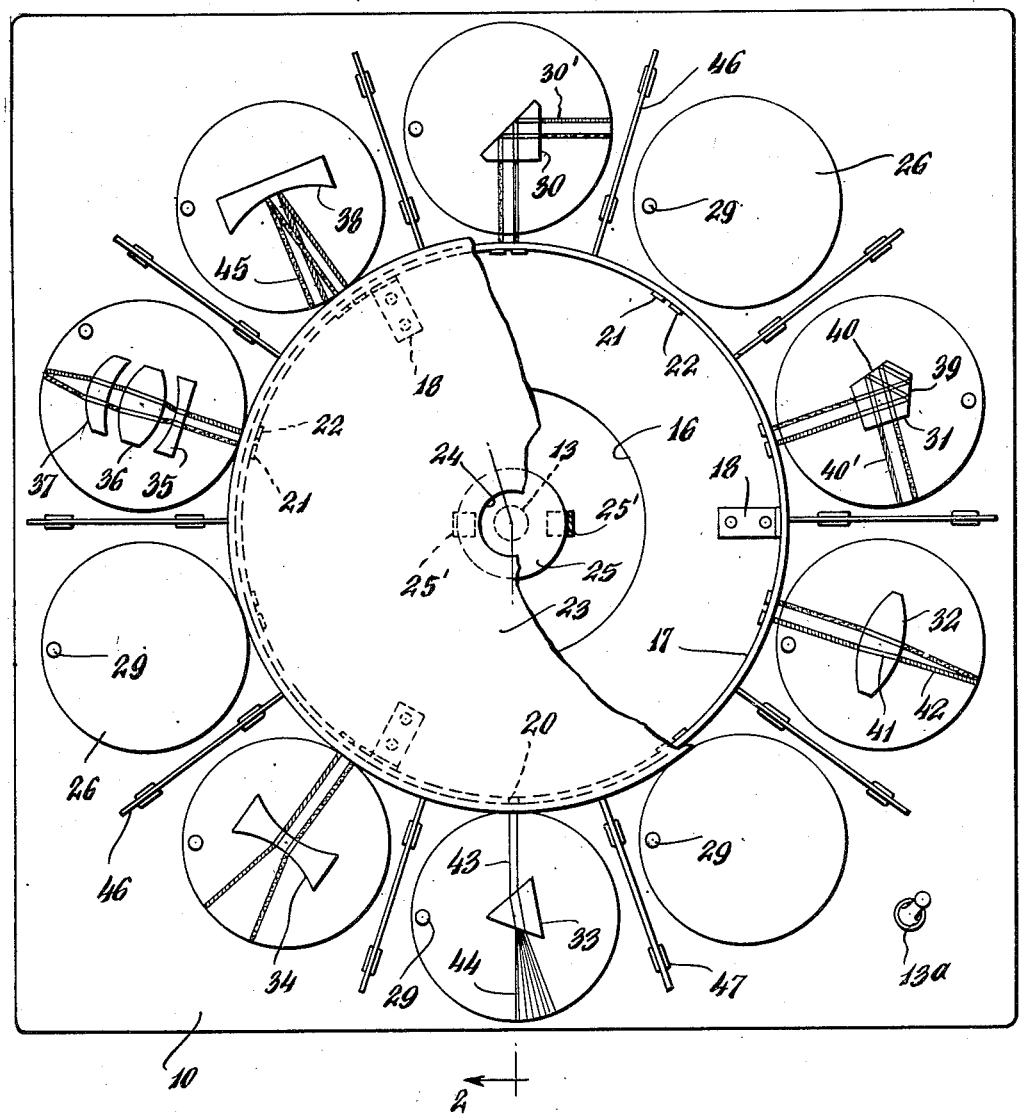

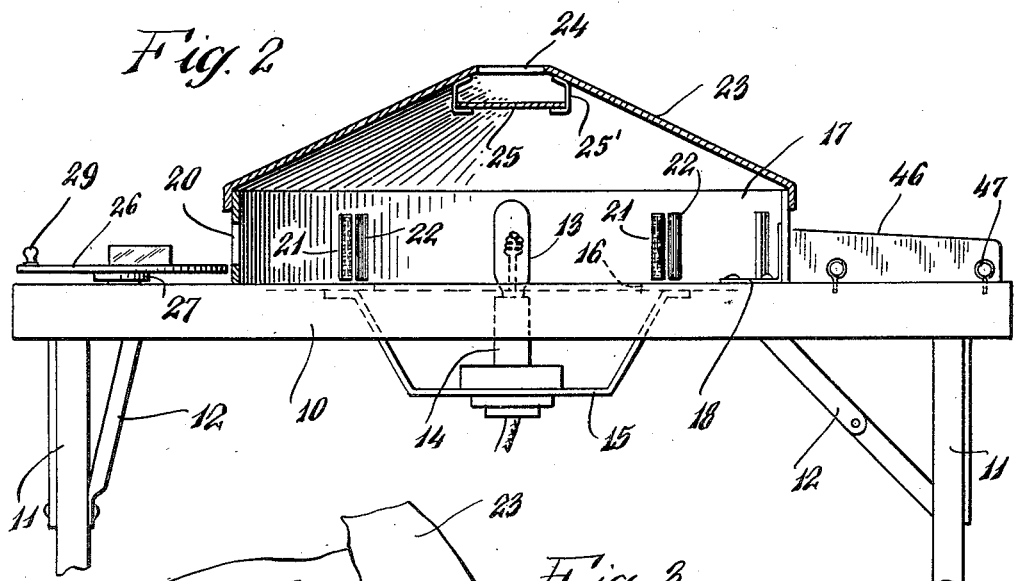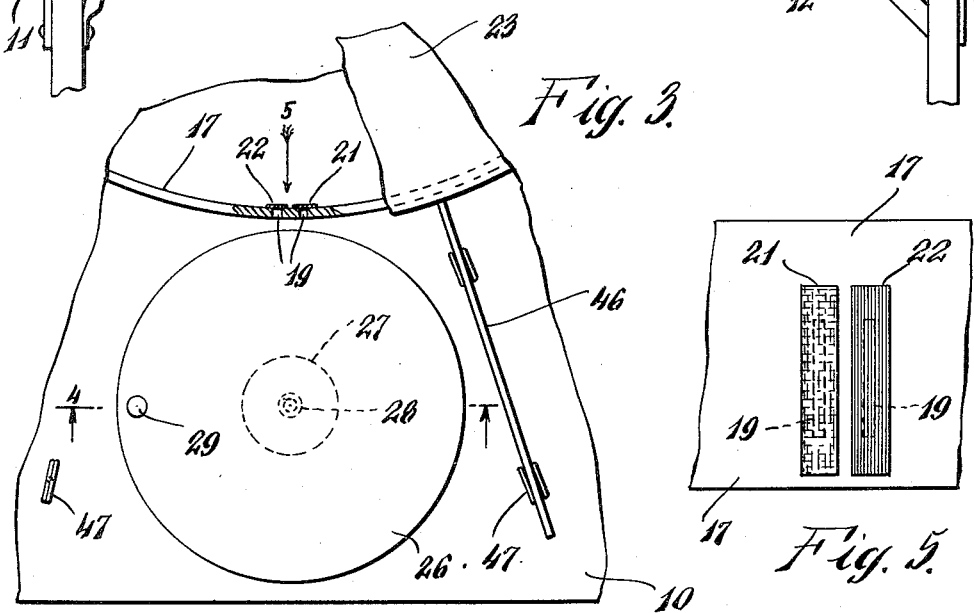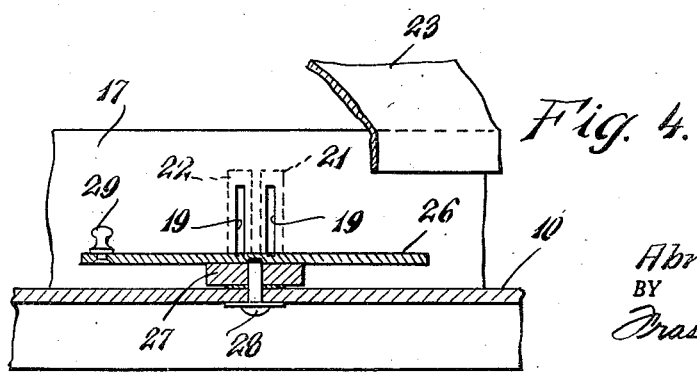

2,529,107

UNITED STATES PATENT OFFICE 2,529,107

OPTICAL DEMONSTRATING DEVICE

Abraham Shapiro, New York, N. Y.

Application December 19, 1945, Serial No. 635,927

3 Claims. (Cl. 35—19)

The present invention relates to a device for use in demonstrating the behavior of light rays or beams in passing through or when projected upon optical elements such as lenses, prisms, mirrors and the like, or combinations of such elements.

The primary object of my invention is to provide a simple and economical device devoid of expensive lenses and mountings therefor, etc., for demonstrating to students of optics the basic principles of reflection and refraction of light. A further object is to provide a device which can be used as an advertising medium for attracting and holding the attention of passers-by. A still further object is to provide an amusement and educational device by means of which persons yet unfamiliar with the laws of reflection and refraction of light can produce various interesting optical effects by disposing in the paths of projected light beams or rays, arbitrary arrangements of optical elements which may be held in fixed relation to one another or which, while so disposed, are moved relatively to the light rays.

The foregoing and other objects of my invention not specifically enumerated I accomplish by providing a device comprising a light source, one or more movable platforms spaced from the light source and each adapted to support an optical element thereon, and opaque light shielding means between the light source and the platform or platforms having one or more slits therein for the passage therethrough of light from the source in the form of a beam or beams for projection onto and across a platform and onto an optical element when mounted on a platform. Preferably, the light source consists of a single electric light bulb capable of producing a bright substantially white light, and the opaque shield is disposed to surround the light bulb, the shield having spaced slits therein, one or more of which are covered with colored transparent light filters. The invention will be better understood from the detailed description which follows, when considered in connection with the accompanying drawings where I have illustrated a preferred embodiment of my invention and wherein:

Figure 1 is a top plan view, with parts broken away, showing an embodiment of my invention.

Fig. 2 is a section taken along the planes of the broken line 2—2 of Fig. 1.

Fig. 3 is an enlarged top elevation of a portion of the device with parts broken away to better illustrate the construction thereof.

Fig. 4 is a section taken substantially along the plane of the line 4—4 of Fig. 3.

Fig. 5 is a fractional elevation of a detail of the invention as viewed in the direction of the arrow 5 in Fig. 3.

Referring to the drawings, in the various figures of which the same reference characters are employed to designate corresponding parts, the numeral 10 indicates a support for the device which may be of any desired construction, herein shown as a bridge table top or the like having legs 11 and collapsible brackets 12. Mounted to extend perpendicularly to the table top substantially centrally thereof is an electric light bulb 13 which provides a source of illumination for the device, the said bulb being mounted in a socket 14 supported on a bracket 15 secured to the underside of the table, which is formed with a central opening 16. Electric current for the light bulb 13 may be controlled by a switch 13a mounted on the table top 10. Mounted on the table top in surrounding and preferably concentric relation to the light bulb 13 is an opaque baffle or shield 17 which may be formed of any suitable material such as metal, fiber, cardboard and the like, and may be rigidly secured to the table top by angle brackets 18 or the like. The baffle 17 has formed therein a plurality of spaced apart slits 19 in substantially radial alignment with the light bulb 13, and said slits are preferably grouped in pairs so as to permit the light from the source to pass through said slits and emerge therefrom in substantially parallel beams or rays. It is desirable, however, that at least one of these slits which is designated 20 be a single slit, for a purpose which will presently appear. It is also desirable that the slits 19 in the baffle be covered with colored transparent light filtering material 21 and 22, preferably adhesively applied to the inner face of the baffle, and that said light filtering material 21 and 22 be differently colored, herein shown as yellow and red, respectively, for a purpose which will presently appear. Covering the baffle 17 is a removable hood or cover 23 to prevent the illumination from the light bulb 13 flooding the surrounding space in which the device is used, and for protecting the eyes of persons viewing the device from the glare of said light bulb. The top of the cover 23 is formed with a central opening 24 for dissipating the heat from the light bulb, and in order that light shall not pass through said opening into the surrounding space, a shield 25 is supported on brackets 25' depending from the cover in spaced relation to the opening 24.

Exteriorly of the baffle 17 there is mounted on the table top 10 a plurality of discs or platforms 26, there being one disc for each group of slits 19 and slit 20, and said platforms are preferably mounted in substantially radial alignment with the slits and the light bulb 13. It is also preferable that these platforms be movable or rotatable relatively to the table top and this may be accomplished in any desired manner, such, for example, as by having each platform supported on a base 27, which, in turn, is rotatably mounted on a pin 28 extending up through the underside of the table top 10. The platforms may be rotated by any desired means, either mechanical or manual, and I have herein shown each baffle as having a knob 29 for manually rotating the same. The discs 26 are so mounted as to have their peripheries in close proximity to the exterior wall of the baffle 17 and the top surfaces of the discs which are preferably coated with white material all lie in a common plane which intersects the baffle at approximately the bottom of the slits 19 and 20. In this connection it may be stated that the slits 19 and 20 are of a height or length such as to project the light beams from the light bulb 13 onto and across the platforms.

Each of the platforms is adapted to have mounted thereon and support one or more optical elements such as a right triangular prism 30, a pentagonal prism 31, a double convex section 32, an equilateral triangular prism 33, a double concave section 34, a concave mirror section 38, and a group consisting of a plano-concave section 35, a double convex section 36 and a concavo-convex section 37.

In the use of the device let it be assumed that the various optical elements 30 to 38 or other optical elements are positioned on the various platforms 26 within the range of the beams projected through the slits 19 and 20. These beams will be projected onto and across the faces of the platforms 26 and onto a face or surface of each of the optical elements. Where these optical elements are in the nature of polished glass, Lucite or equivalent material, the rays or beams, in passing therethrough, will be either reflected or refracted, or both, and such reflection and/or refraction will be visible to an observer looking upon the discs. For example, the rays, in passing through the right triangular prism 30, and striking the hypotenuse surface thereof will be reflected as shown at 30', whereas, when the beams pass through the pentagonal prism 31, they will be double reflected, first from the surface 39 and then from the surface 40 and emerge as beams 40'. On the other hand, when the rays strike an optical element such as a double convex section 32, they will be refracted in passing therethrough as indicated at 41, and again refracted as indicated at 42 upon emerging from the element to the atmosphere. The triangular prism section 33 is set on the platform at a critical angle such that when the white light beam 43 provided by the white light source 13 in passing through the uncovered slit 20 strikes the face of the prism it will be refracted in passing therethrough and emerge from the prism as a spectrum 44. By the same token, the light beams passing through the double concave section 34 and the group of optical elements 35, 36 and 37 will be refracted, as shown in Fig. 1 of the drawings. However, where the light rays are caused to strike a mirror surface such as the concave mirror 38, they will be reflected back onto the platform, as shown at 45. It will be noted that the reflected beams from the right angular prism 30 and the pentagonal prism 31 extend in a direction, which, if not intercepted, would be projected onto an adjacent disc and thereby interfere with the optical effects produced by the optical element on said adjacent disc. To avoid this, opaque baffles or shields 46 are interposed between the adjacent discs. These baffles 46 may be supported in any desired fashion, either permanently or temporarily, and as herein shown they are supported in a removable manner by being held between convolutions of spring coil sections 47 held on the table top 10. The function of the colored transparent light filtering material 21 and 22 is to accentuate and more clearly exhibit the paths of the respective rays when acted upon by the interposed optical elements.

Although I have shown the device as mounted on a collapsible bridge table so as to facilitate its use in classrooms or the like, it will be appreciated that the device can be equally well used in an inclined or vertical position. It will be further appreciated that it is desirable that the electric light bulb 13 be of a character to produce a substantially white light of bright intensity, and I have found that when the device is used upon a bridge table, a Mazda T-8 100 watt-115 volt projection bulb serves the purpose admirably well. Should the device be intended for use in a substantially vertical position I have ascertained that a Mazda G-30/31 12 volt, 200 watt bulb will prove efficient. However, inasmuch as the bulbs employed will generate considerable heat, I have provided the opening 16 in the table top and the opening 24 in the cover to allow for dissipation of generated heat.

When used as an educational device for instructing students in optics, the optical elements may be disposed on the platforms in the manner shown in Fig. 1 or in any other arrangement or combination, and by rotating or oscillating platforms the effects and changes in the directions of the projected beams through the optical elements will be readily apparent. If used as an advertising medium any combination of optical elements may be mounted on the platforms and the platforms mechanically rotated or oscillated, as desired, to produce various interesting and attractive effects. The device may be made up in the form of a single or dual unit, that is, with only one or two platforms, and thus serve either as an educational device or toy, since a user, by changing the position of a particular optical element or by using a combination of optical elements, may arbitrarily produce various ornamental effects. By the same token, if the number of slits in a particular group are increased, say to three or four, and a differently colored transparent light filtering material placed over each slit, the effects can be further multiplied.

While I have shown and described a preferred embodiment of my invention it will be understood that the same is subject to modification and change within the range of mechanical skill, without departing from the spirit of my invention as defined in the appended claims.

What I claim is:

1. A device of the character described, comprising a light source, an annular opaque shield surrounding said light source and having therein a plurality of spaced apart slits in substantially radial alignment with the light source, a plurality of platforms each adapted to support an optical element thereon, said platforms being disposed in a common plane which is substantially perpendicular to the planes of the slits in the shield, at least some of said platforms being rotatable discs mounted on centers which are substantially in radial alignment with the slits in the shield, supplemental opaque shields disposed between adjacent platforms and each slit being of a length and so related to a platform to project a beam of light from the light source onto and across a platform and onto an optical element when supported on a platform.

2. A device of the character described, comprising a light source, an annular opaque shield surrounding said light source and having therein a plurality of spaced apart slits in substantially radial alignment with the light source, a plurality of platforms each adapted to support an optical element thereon, said platforms being disposed in a common plane which is substantially perpendicular to the planes of the slits and each slit being of a length and so related to a platform to project a beam of light from the light source onto and across a platform and onto an optical element when supported on a platform, certain of the slits being grouped together in closely spaced relation so as to project a plurality of substantially parallel beams of light from the light source onto and across a platform.

3. A device according to claim 2 wherein the separate slits of a group of closely spaced slits are each covered with a different colored transparent light filtering material.

ABRAHAM SHAPIRO.

REFERENCES CITED

The following references are of record in the file of this patent:

UNITED STATES PATENTS

| Number | Name | Date |
| --- | --- | --- |
| 1,075,009 | Burton | Oct. 7, 1913 |
| 1,439,640 | Rommer | Dec. 19, 1922 |
| 1,471,615 | Leffingwell | Oct. 23, 1923 |
| 1,828,057 | Lunt | Oct. 20, 1931 |
| 2,194,238 | Weaver | Mar. 19, 1940 |